US012583343B2

(12) United States Patent
Dieckmann

(10) Patent No.: US 12,583,343 B2
(45) Date of Patent: Mar. 24, 2026

(54) TRAILER VEHICLE HAVING AN ELECTRIC DRIVE AND COMBINATION INCLUDING THE TRAILER VEHICLE, AND METHOD FOR OPERATING THE TRAILER VEHICLE

(71) Applicant: ZF CV Systems Global GmbH, Bern (CH)

(72) Inventor: Thomas Dieckmann, Pattensen (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/633,259

(22) Filed: Apr. 11, 2024

(65) Prior Publication Data

US 2024/0262221 A1     Aug. 8, 2024

Related U.S. Application Data

(63) Continuation of application No. PCT/EP2022/076567, filed on Sep. 23, 2022.

(30) Foreign Application Priority Data

Oct. 25, 2021     (DE) ..................... 10 2021 127 653.5

(51) Int. Cl.
*B60L 50/64*          (2019.01)
*B60L 50/60*          (2019.01)
(Continued)

(52) U.S. Cl.
CPC ............... *B60L 53/16* (2019.02); *B60L 50/60* (2019.02); *B60L 2200/28* (2013.01)

(58) Field of Classification Search
CPC ........ B60Y 2200/148; B60Y 2200/142; B60Y 2200/145; B60K 1/04; B60K 2001/0438;
(Continued)

(56) References Cited

U.S. PATENT DOCUMENTS 9,566,854 B2     2/2017  Kerschl et al.
2011/0048827 A1*  3/2011  Cherney ................... B60L 7/02
                                                 180/65.245
(Continued)

FOREIGN PATENT DOCUMENTS

DE     10 2011 056 921 A1     6/2013
DE     20 2016 006 076 A1     12/2016
(Continued)

OTHER PUBLICATIONS

EP3862205 Translation (Year: 2021).*
(Continued)

*Primary Examiner* — Elim Ortiz
(74) *Attorney, Agent, or Firm* — Walter Ottesen, P.A.

(57)                    ABSTRACT

A trailer vehicle, in particular a semi-trailer, for a towing vehicle has an electric drive, and the electric drive includes at least one electric motor for driving at least one wheel of the trailer vehicle and an energy store for supplying the electric motor. The energy store stores energy of more than 250 kWh or more than 500 kWh, preferably more than 750 kWh or more than 1000 kWh. A combination vehicle can include the trailer vehicle and a method is for operating a trailer vehicle.

21 Claims, 1 Drawing Sheet

(51) Int. Cl.

| | |
|---|---|
| *B60L 53/14* | (2019.01) |
| *B60L 53/16* | (2019.01) |
| *B60L 53/30* | (2019.01) |
| *B60L 58/10* | (2019.01) |
| *B60L 58/22* | (2019.01) |

(58) Field of Classification Search
CPC .... B60K 2001/0444; B60K 2001/0477; Y02T 10/70; Y02T 10/7072; B60L 53/80; B60L 53/16; B60L 50/60; B60L 2200/28; B60L 50/64; B60L 2200/36; B60L 53/30; B60L 58/10; B60L 58/22; B60L 53/14
USPC ..... 701/22; 180/65.29, 65.21, 65.265, 65.22, 180/65.245, 65.25, 65.1, 65.31; 903/903; 320/136
See application file for complete search history.

(56) References Cited

U.S. PATENT DOCUMENTS

| | | | |
|---|---|---|---|
| 2014/0375272 A1 | 12/2014 | Johnsen et al. | |
| 2015/0060160 A1* | 3/2015 | Kerschl ................... | B62D 53/00 |
| | | | 180/54.1 |

FOREIGN PATENT DOCUMENTS

| | | | | |
|---|---|---|---|---|
| DE | 10 2018 001 298 A1 | 8/2019 | | |
| DE | 10 2019 205 480 A1 | 10/2020 | | |
| DE | 10 2019 207 447 A1 | 11/2020 | | |
| DE | 10 2020 000 734 A1 | 8/2021 | | |
| EP | 3862205 A1 * | 8/2021 | .............. | B60K 1/04 |

OTHER PUBLICATIONS

English translation and Written Opinion of the International Searching Authority dated Dec. 20, 2022 for international application PCT/EP2022/076567 on which this application is based.

International Search Report of the European Patent Office dated Dec. 20, 2022 for international application PCT/EP2022/076567 on which this application is based.

StVZO, "Road approval order (StVZO) 34 axle load and total weight", Section 41, paragraphs 15 and 18, https://www.gesetze-im-internet.de/stvzo_2012/_34.html, 2012, with English translation, pp. 1 to 4 (8 pages).

Firmenauto website, "800-volt technology explained More voltage-faster charging", https://www.firmenauto.de/800-volt-technik-erklaert-mehr-spannung-schneller-laden-11187135.html, Jun. 20, 2020, with English translation, pp. 1 to 7 (14 pages).

English translation and Office Action of the European Patent Office dated Aug. 8, 2025 in corresponding European 1 patent application No. 22783344.9.

* cited by examiner

TRAILER VEHICLE HAVING AN ELECTRIC DRIVE AND COMBINATION INCLUDING THE TRAILER VEHICLE, AND METHOD FOR OPERATING THE TRAILER VEHICLE

CROSS-REFERENCE TO RELATED APPLICATIONS

This application is a continuation application of international patent application PCT/EP2022/076567, filed Sep. 23, 2022, designating the United States and claiming priority from German application 10 2021 127 653.5, filed Oct. 25, 2021, and the entire content of both applications is incorporated herein by reference.

TECHNICAL FIELD

The disclosure relates to the field of commercial vehicles and in this case in particular trailer vehicles or simply trailers, which are configured as commercial vehicles. A trailer vehicle configured as a commercial vehicle is towed by a towing vehicle that is likewise configured as a commercial vehicle, for example. Such trailer vehicles designated here are, in particular, semi-trailers and drawbar trailers.

BACKGROUND

According to the prior art, vehicles are equipped increasingly frequently with an electric drive. Accordingly, commercial vehicles are also known in the form of hybrid vehicles which, in addition to an internal combustion engine as the primary drive source, additionally have at least one electric drive for support. In towing vehicles configured as commercial vehicles, the electric drives have historically mainly served to make it possible to operate the internal combustion engine in an energy-efficient speed range or additionally to provide thrust, for example when starting off or when traveling uphill. Using the electric drives makes it possible to recover kinetic and potential energy of the vehicle, for example when braking, and to store it as electrical energy in one or more energy stores in order to make the electrical energy available again for forward drive when required.

Moreover, trailer vehicles are increasingly being fitted with an electric drive in order to provide additional driving force for a towing vehicle that is configured as the above-mentioned hybrid vehicle, including an internal combustion engine and an electric drive. Trailer vehicles with an electric drive can also be operated using towing vehicles which exclusively have an internal combustion engine, in order thus to form a hybridized combination vehicle by way of the trailer vehicle. Regardless of the type of drive of the towing vehicle, electric drives in the trailer vehicle specifically also serve to support requests for negative acceleration, specifically for braking. In this way, friction brakes of the combination vehicle composed of the towing vehicle and at least one trailer vehicle can also be preserved.

However, there is an increasing desire also for commercial vehicles to dispense with an internal combustion engine completely. Previous approaches, however, have so far only resulted in vehicle ranges that are unsuitable for use in long-distance transport. For example, long-distance transport requires a commercial vehicle substantially to be able to travel a minimum distance approximately in the range from 700 to 800 km, without relatively long interruptions. Existing solutions, however, require longer break times on such routes, in order to charge the energy stores multiple times. Known commercial vehicles for longer distances are therefore limited to medium-duty trucks with a fixed body to provide an area or a space for payloads. Medium-duty trucks such as this are also usually limited to distances of approximately 400 km, however, and therefore do not satisfy the requirements for use in long-distance transport.

SUMMARY

It is an object of the present disclosure to address the problems of the prior art. In particular, the aim is to find a way to also use heavy-duty trucks or combination vehicles in long-distance transport without an internal combustion engine. In any case, the aim is to find an alternative to the prior art.

In this regard, the disclosure relates to a trailer vehicle for a towing vehicle. The trailer vehicle includes: an electric drive having at least one electric motor for driving at least one wheel of the trailer vehicle; and, an energy store for supplying the electric motor, wherein the energy store is configured to store energy of more than 250 kWh.

Accordingly, a trailer vehicle for a towing vehicle is proposed, wherein the trailer vehicle is in particular a semi-trailer or a drawbar trailer. The trailer vehicle has an electric drive, wherein the electric drive includes at least one electric motor for driving at least one wheel of the trailer vehicle. Moreover, the electric drive includes an energy store for supplying the electric motor. Furthermore, the energy store is configured in such a way that it stores energy of more than 250 kWh or more than 500 kWh. In particular, the energy store stores more than 750 kWh or more than 1000 kWh. The term energy store is used here in the singular, but it also encompasses energy stores which are composed of a plurality of modules or cells and which are connected to one another in a suitable manner in order to form the energy store.

By using such a trailer vehicle that has a particularly large energy store for supplying the electric drive of the trailer vehicle, a towing vehicle for towing the trailer vehicle can be completely relieved of the weight of the trailer vehicle. In essence, therefore, the towing vehicle does not have to bear any towing load. The electric drive of the trailer vehicle is in this case configured in such a way that it can move the entire weight of the trailer vehicle forward independently, including a load. Furthermore, high-power or maximum-power recharging is not required during the course of a day. Rather, the trailer vehicle can be charged comparatively slowly during its rest time. The load on the network is lower and night-time rates or surplus rates can be used, so that the energy is less expensive than it is when charging during the day and in particular when charging at high-power. 100 kW of power over approximately 10 hours at night is enough to recharge a 1000 kWh battery, for example.

The disclosure is in this case based on the understanding that construction space for arranging energy stores in the towing vehicle is available only to a limited extent. Accordingly, to configure a towing vehicle in accordance with present-day standards in such a way that it substantially applies the entire propulsive force for the towing vehicle and its trailer vehicle is therefore not possible, at least using the energy stores produced to date. The disclosure accordingly makes use of the fact that a reduction in the payload in the trailer vehicle via additional energy stores is acceptable in order to provide complete electric drive for a combination vehicle on long-distance routes and also for heavy weights. A towing vehicle accordingly only has to apply the force for its own propulsion over a required minimum distance for long-distance transport, which means that only appropriate energy stores need be arranged in the towing vehicle.

According to a first embodiment, the trailer vehicle has a transporting area that can also be configured as a transporting volume, which is configured for a payload of at least 15 tons or at least 18 tons. In particular, the transporting area is configured for a payload of at least 21 tons, for example more than 21 tons. Heavy-duty loads can therefore be conveyed using the trailer vehicle.

According to a further embodiment, the trailer vehicle has a charging cable or a charging interface for a charging cable for charging the energy store at an external charging station. The charging interface is preferably configured to absorb energy at a voltage of more than 100 V or more than 350 V, for example 400 V, preferably more than 750 V, for example 800 V. If the trailer vehicle is therefore operated together with a towing vehicle that is likewise driven forward purely electrically, the towing vehicle normally has a connector for a charging cable for charging the energy store of the towing vehicle. The trailer vehicle therefore also has a connector or a charging cable for charging and can therefore be charged in parallel with and independently of the towing vehicle at a charging station. The charging time for the combination vehicle is therefore shortened significantly compared to charging the trailer vehicle via the charging cable of the towing vehicle, for example.

According to a further embodiment, the trailer vehicle has further electrical interfaces for connection to a towing vehicle. All the electrical interfaces for providing a connection to the towing vehicle can, however, be operated at non-high voltage. This means that the further electrical interfaces can be operated at a voltage below 100 V, in particular below a predefined contact voltage limit, specifically at or below 60 V, in particular 60 V DC voltage. Accordingly, the trailer vehicle can therefore be connected to a towing vehicle only via a trailer coupling, such as a fifth-wheel coupling for example, and pressure lines as well as electrical lines which are non-high voltage, that is, with no charging energy transfer. Energy transfer for charging the energy store of the trailer vehicle by way of the towing vehicle is therefore ruled out.

Energy transfer between the towing vehicle and the trailer vehicle for charging the energy stores of an electric drive requires a high-voltage line that would have to withstand in particular vibrations during operation and at the same time also meet the applicable safety requirements. In this respect, the production of such a connection between a towing vehicle and a trailer vehicle would be very complex and difficult to produce for continuous use.

According to the disclosure, however, such a connection can be dispensed with because the trailer vehicle has sufficient energy for a long-distance journey on account of the large energy store configured according to the disclosure. The trailer vehicle therefore can be accelerated substantially independently of a towing vehicle and places no further propulsion demands on the towing vehicle. In this respect, it is therefore also possible to operate the trailer vehicle using a conventional towing vehicle that includes an internal combustion engine, if for example a purely electric towing vehicle is not available. The advantages of the trailer vehicle, namely being operated substantially independently over a long distance and in the process relieving the towing vehicle of effort to a maximum extent, would also result in comparatively low consumption by the towing vehicle using an internal combustion engine.

According to a further embodiment, the energy store is arranged between frame longitudinal members of the trailer vehicle. If the trailer vehicle is a semi-trailer, the energy store is arranged in the region between a king pin or a region of a gooseneck or supports and a region of the front axle. If the trailer vehicle is a drawbar trailer, the energy store is arranged in the region between the axles, that is, between a front and a rear axle.

This is based on the understanding that an installation space for a small energy store, which is customary in trailer vehicles today, can essentially be selected in any desired location, since the energy store does not represent a substantial risk. Especially in the case of larger energy stores, however, there is the danger that these larger energy stores could ignite as a result of an impact or an accident, in which case it is very difficult and burdensome to extinguish a fire from a large energy store. Accordingly, a safe installation space is proposed and encompassed in the described embodiment, which means that the energy store is arranged in a manner protected both by the frame and by the axles of the trailer vehicle. An impact by another vehicle will be absorbed, for example, by the parts that surround the energy store, thereby reducing the risk of fire.

The disclosure further relates to a combination vehicle including a towing vehicle and a trailer vehicle according to one of the abovementioned embodiments.

According to an embodiment, the towing vehicle is a battery electric towing vehicle, also referred to as a BEV. The towing vehicle is a tractor unit, for example. The entire combination vehicle therefore does not require an internal combustion engine.

According to a further embodiment, all the electrical connections for operating the combination vehicle between the towing vehicle and the trailer vehicle are low-voltage connections. An electrical voltage between conductors of each connection of all the electrical connections between the towing vehicle and the trailer vehicle is therefore also below 100 V or in particular at or below 60 V during operation.

According to a further embodiment of the combination vehicle, an electrical connection is provided between the towing vehicle and the trailer vehicle, which electrical connection is a low-voltage line that serves to transfer energy from the energy store of the trailer vehicle to the towing vehicle or vice versa. A balancing of charges between the energy stores of the towing vehicle and trailer vehicle is thus possible to a limited extent, in particular so as to still be able to move the combination vehicle if necessary, specifically if one of the energy stores fails unexpectedly or is significantly more discharged than the energy store of the other vehicle. Accordingly, a high-voltage connection can furthermore be dispensed with.

According to a further embodiment, the towing vehicle and the trailer vehicle each have a separate charging interface, in order for each to be connected to an external charging station via a charging cable. The charging interface of the towing vehicle is configured to exclusively charge the energy store of the towing vehicle and the charging interface of the trailer vehicle is configured to exclusively charge the energy store of the trailer vehicle. A reduction in the charging time is thus made possible by parallel charging of both vehicles of the combination vehicle.

The disclosure furthermore includes a method for operating a trailer vehicle according to one of the abovementioned embodiments or a combination vehicle according to one of the abovementioned embodiments. The method includes charging an energy store of the trailer vehicle until the energy store of the trailer vehicle has energy of more than 250 kWh or more than 500 kWh. For example, the energy store is charged until it stores energy of more than 750 kWh or more than 1000 kWh. According to the method, at least one electric motor of the trailer vehicle is operated using the charged energy from the energy store.

According to a further embodiment of the method, the charging takes place via a charging interface of the trailer vehicle. The charging interface serves to charge the energy store at a voltage of more than 100 V, in particular more than 350 V, for example 400 V, or more than 750 V, for example 800 V.

According to a further embodiment, during the charging of the energy store of the trailer vehicle via a charging interface of the trailer vehicle, an energy store of a towing vehicle is simultaneously charged using a further charging interface of the towing vehicle.

The disclosure furthermore relates to the use of an energy store in a trailer vehicle, which energy store is configured to store energy of more than 250 kWh or more than 500 kWh. The energy store is particularly preferably configured to store a charge of more than 750 kWh or more than 1000 kWh. At least one electric motor of the trailer vehicle is operated using the energy store.

BRIEF DESCRIPTION OF DRAWINGS

The invention will now be described with reference to the drawings wherein.

DETAILED DESCRIPTION

Figure 1:
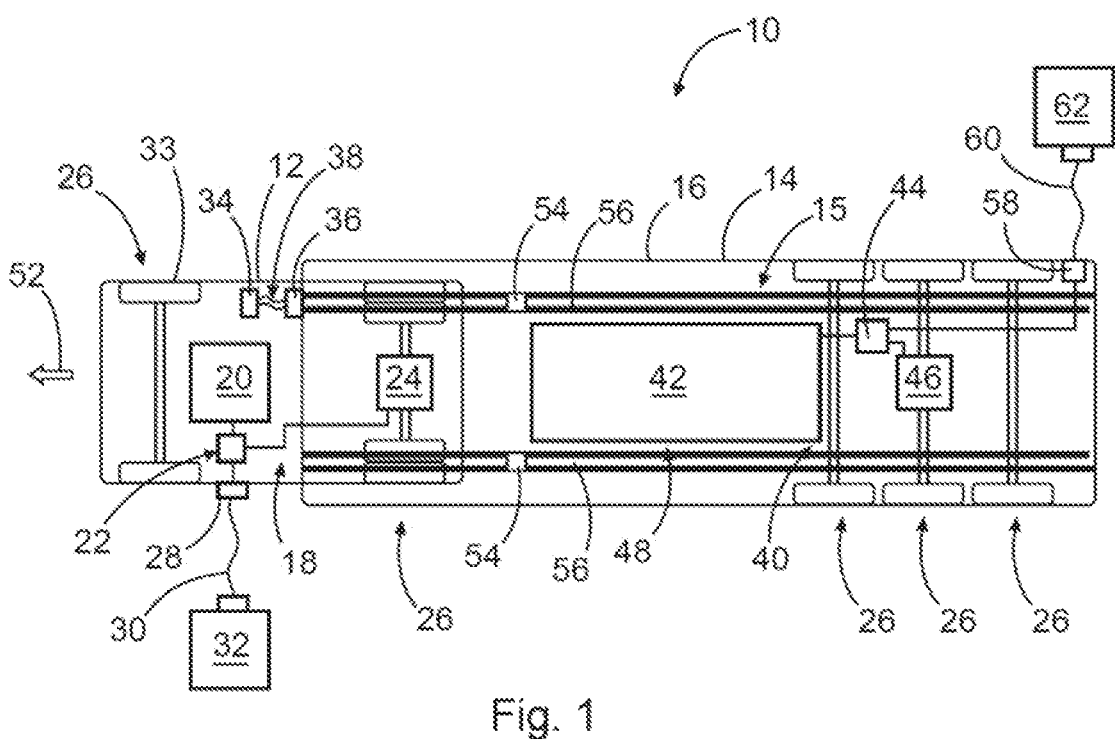
FIG. 1 shows a combination vehicle made up of a towing vehicle and a trailer vehicle; and, FIG. 2 shows the steps of the method.

FIG. 1 shows a combination vehicle 10 including a towing vehicle 12 and a trailer vehicle 14. The trailer vehicle 14 has a transporting area 15. The trailer vehicle 14 here is configured as a semi-trailer 16 and connected to the towing vehicle via a king pin (not depicted). The towing vehicle 12 has an electric drive 18. The electric drive 18 of the towing vehicle includes an energy store 20 which is connected to an electric motor 24 of an axle 26 of the towing vehicle 12 via an inverter 22, in order to drive the axle 26. In FIG. 1, for a better overview, the towing vehicle 12 has only two axles 26, although towing vehicles for semi-trailers 16, which are also referred to as tractor units, also sometimes have more than two axles, frequently three axles. The towing vehicle 12 depicted here accordingly only represents an example of towing vehicles 12 of this type, and the disclosure also includes towing vehicles 12 with more than two axles.

The towing vehicle 12 furthermore has a charging interface 28 which can be connected to an external charging station 32 via a charging cable or simply cable 30. The energy store 20 can thus be charged. The towing vehicle 12 here is a battery electric vehicle, BEV 33, and therefore has no additional internal combustion engine. The towing vehicle 12 furthermore has connectors 34 which can be connected to connectors 36 of the trailer vehicle 14 via further electrical connections 38. These connectors 34 of the trailer vehicle 14 can all be operated at a voltage below 100 V or at or below 60 V.

In the same way as with the towing vehicle 12, the trailer vehicle 14 also has an electric drive 40. The electric drive 40 includes an energy store 42 which is electrically connected to an electric motor 46 via an inverter 44. The electric motor 46 serves to drive an axle 26 of the trailer vehicle 14. In the present case, only a single electric motor 46 is depicted as the central axle motor for driving the axle 26. This depiction is by way of example and the disclosure also includes an alternative embodiment (not depicted here) in which a plurality of electric motors 46 are provided which do not drive the axle 26 but rather, as wheel motors, each drive a wheel directly. Further embodiments included in the disclosure include the driving of a plurality of axles 26 of the trailer vehicle 14 using a plurality of central axle motors or the driving of a plurality of wheels of a plurality of axles 26 using individual wheel motors.

The energy store 42 is arranged in a region 48 which lies in the longitudinal direction between the axle 26 of the trailer vehicle 14 positioned furthest to the front in the direction of travel 52 and supports 54 of the trailer vehicle 14 for coupling and uncoupling. Furthermore, the region 48 in which the energy store 42 is located is bordered in the transverse direction by two frame longitudinal members 56 of the frame (not depicted in full here) of the trailer vehicle 14. The energy store 42 is therefore protected from impacts.

Furthermore, a charging interface 58 of the trailer vehicle 14 is provided, which charging interface 58 can be electrically connected to a further external charging station 62 via a charging cable 60, or simply cable 60, that is, an electrical line, in order to charge the energy store 42 of the trailer vehicle 14. In the present case, the charging interface 58 is connected to the energy store 42 via the inverter 44, which is necessary for situations when the external charging station 62 provides AC voltage. Furthermore, however, the disclosure also includes an embodiment in which the charging interface 58 is connected to the energy store 42 without an interconnected inverter 44, in order to charge the energy store 42 using DC voltage for rapid charging, for example.

Figure 2:
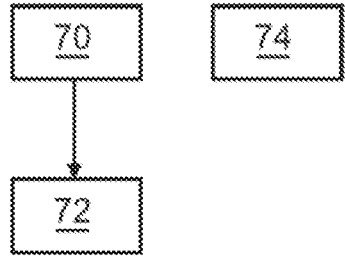

FIG. 2 shows the steps of an embodiment of a method for operating a trailer vehicle 14. In step 70, an energy store 42 is charged until it stores energy of more than 250 kWh, more than 500 kWh, more than 750 kWh or more than 1000 kWh. In step 72, the electric motor 46 of the trailer vehicle 14 is operated using the energy from the energy store 42. Parallel to step 70, in which the energy store 42 of the trailer vehicle 14 is charged, in a step 74 an energy store 20 of a towing vehicle 12 is charged.

It is understood that the foregoing description is that of the preferred embodiments of the invention and that various changes and modifications may be made thereto without departing from the spirit and scope of the invention as defined in the appended claims.

LIST OF REFERENCE SIGNS 10 combination vehicle
12 towing vehicle
14 trailer vehicle
15 transporting area
16 semi-trailer
18 electric drive
20 energy store
22 inverter
24 electric motor
26 axle
28 charging interface
30 cable
32 external charging station
33 battery electric vehicle, BEV
34 connectors of the towing vehicle
36 connectors of the trailer vehicle
38 electrical connections
40 electric drive 42 energy store
44 inverter
46 electric motor
48 region
54 supports
56 frame longitudinal members
58 charging interface
60 cable
62 external charging station
70 charging of energy store of trailer vehicle
72 operation of electric motor of the trailer vehicle
74 charging of energy store of towing vehicle

The invention claimed is:

1. A trailer vehicle for a towing vehicle, the trailer vehicle comprising:
    an electric drive having at least one electric motor for driving at least one wheel of the trailer vehicle; and,
    an energy store for supplying said electric motor, wherein said energy store is configured to store energy of more than 250 kWh,
    wherein said at least one electric motor is configured to drive said at least one wheel of the trailer vehicle while the trailer vehicle is connected to the towing vehicle.

2. The trailer vehicle of claim 1, wherein the trailer vehicle has a transporting area configured for a payload of at least one of: at least 15 tons, at least 18 tons, and at least 21 tons of payload.

3. The trailer vehicle of claim 1 further comprising a charging cable or a charging interface for the charging cable for charging said energy store via an external charging station.

4. The trailer vehicle of claim 3 further comprising further electrical interfaces for connection to a towing vehicle, wherein all interfaces of the trailer vehicle are configured to be operated at a voltage below 100 V to provide the connection to the towing vehicle.

5. The trailer vehicle of claim 3 further comprising further electrical interfaces for connection to a towing vehicle, wherein all interfaces of the trailer vehicle are configured to be operated at a voltage below 60 V to provide the connection to the towing vehicle.

6. The trailer vehicle of claim 1, wherein said energy store is arranged between frame longitudinal members of the trailer vehicle.

7. The trailer vehicle of claim 1, wherein said energy store is arranged between frame longitudinal members of the trailer vehicle and in a region between supports of the trailer vehicle and axles of the trailer vehicle.

8. The trailer vehicle of claim 1, wherein the trailer vehicle is a semi-trailer.

9. The trailer vehicle of claim 1, wherein said energy store is configured to store energy of more than at least one of 500 kWh, 750 kWh, and 1000 kWh.

10. A combination vehicle comprising:
    a towing vehicle;
    a trailer vehicle including an electric drive and an energy store for supplying an electric motor;
    said electric drive including the electric motor for driving at least one wheel of the trailer vehicle; and,
    said energy store being configured to store energy of more than 250 kWh or more than 500 kWh, more than 750 kWh or more than 1000 kWh, wherein the electric motor is configured to drive said at least one wheel of the trailer vehicle while the trailer vehicle is connected to the towing vehicle.

11. The combination vehicle of claim 10, wherein said towing vehicle is a battery electric vehicle.

12. The combination vehicle of claim 10, wherein all electrical connections between said towing vehicle and said trailer vehicle each have a voltage below 100 V during operation of the combination vehicle.

13. The combination vehicle of claim 10, wherein all electrical connections between said towing vehicle and said trailer vehicle each have a voltage at or below 60 V during operation of the combination vehicle.

14. The combination vehicle of claim 10, wherein an electrical connection is provided between said towing vehicle and said trailer vehicle in order to transfer energy from said energy store of said trailer vehicle to said towing vehicle or from said towing vehicle to said trailer vehicle; and, said electrical connection is a low-voltage line.

15. The combination vehicle of claim 14, wherein said low-voltage line is at a voltage of below 100 V.

16. The combination vehicle of claim 10, wherein said towing vehicle has a first charging interface and said trailer vehicle has a second charging interface; said first charging interface and said second charging interface are mutually separate; said first charging interface of said towing vehicle is configured to exclusively charge a towing vehicle energy store of the towing vehicle; and, said second charging interface of the trailer vehicle is configured to exclusively charge said energy store of said trailer vehicle.

17. A method for operating a trailer vehicle for a towing vehicle, the trailer vehicle having an electric drive and an energy store for supplying an electric motor, the electric drive including the electric motor for driving at least one wheel of the trailer vehicle, the energy store being configured to store energy of more than 250 kWh, the method comprising:
    charging the energy store of the trailer vehicle until the energy store of the trailer vehicle stores energy of more than at least one of 250 kWh, 500 kWh, 750 kWh, and 1000 kWh; and,
    operating the electric motor of the trailer vehicle via the energy from the energy store to drive said at least one wheel of the trailer vehicle while the trailer vehicle is connected to the towing vehicle.

18. The method of claim 17, wherein said charging takes place via a charging interface of the trailer vehicle.

19. The method of claim 17, wherein said charging takes place via a charging interface of the trailer vehicle at a voltage of more than at least one of 100 V, 350 V, 400 V, 750 V, and 800 V.

20. The method of claim 17, wherein the towing vehicle of a combination vehicle that includes the trailer vehicle is simultaneously charged during said charging of the energy store of the trailer vehicle.

21. The trailer vehicle of claim 1,
    wherein said energy store is electrically isolated from any electric motor for driving wheels of the towing vehicle, and
    wherein said energy store does not supply power to any electric motor for driving wheels of the towing vehicle.

* * * * *